April 21, 1964

I. C. ALLEN ETAL 3,129,586

APPARATUS FOR TESTING CERTAIN CHARACTERISTICS OF PAPER AND THE LIKE

Filed March 8, 1961

INVENTORS:
Irving C. Allen
Don C. Nepper
Frank F. Oehme
By Gary, Desmond & Parker Attys April 21, 1964  I. C. ALLEN ETAL  3,129,586
APPARATUS FOR TESTING CERTAIN CHARACTERISTICS
OF PAPER AND THE LIKE
Filed March 8, 1961  3 Sheets-Sheet 2
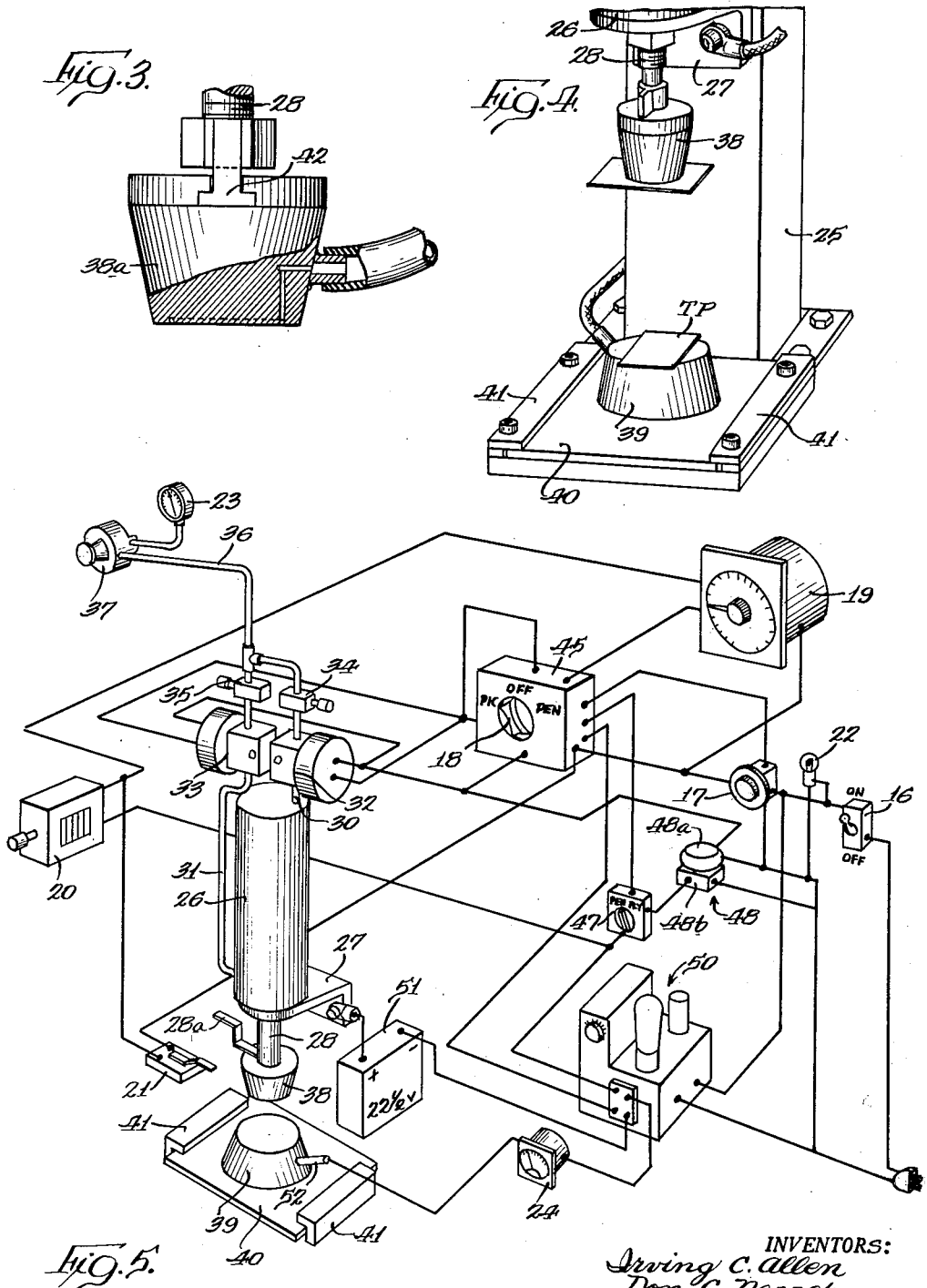
INVENTORS:
Irving C. Allen
Don C. Nepper
Frank F. Oehme
By Gary, Desmond & Parker
Attys April 21, 1964    I. C. ALLEN ETAL    3,129,586
APPARATUS FOR TESTING CERTAIN CHARACTERISTICS
OF PAPER AND THE LIKE
Filed March 8, 1961    3 Sheets-Sheet 3
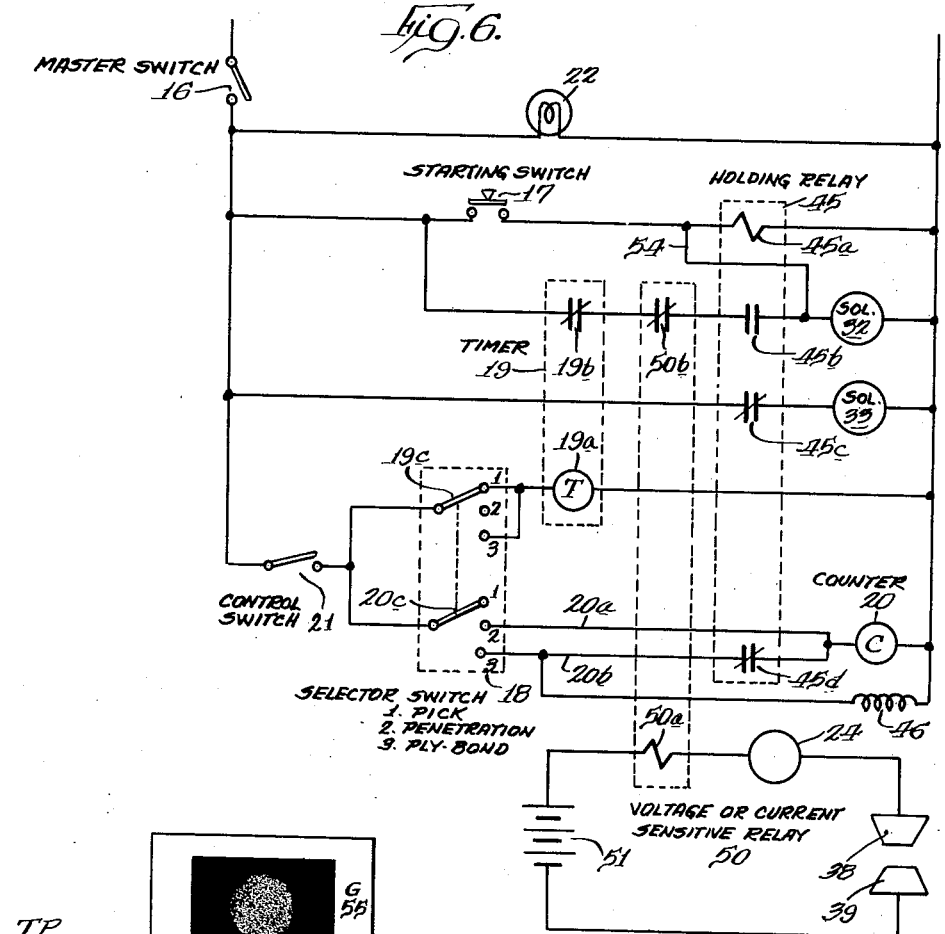
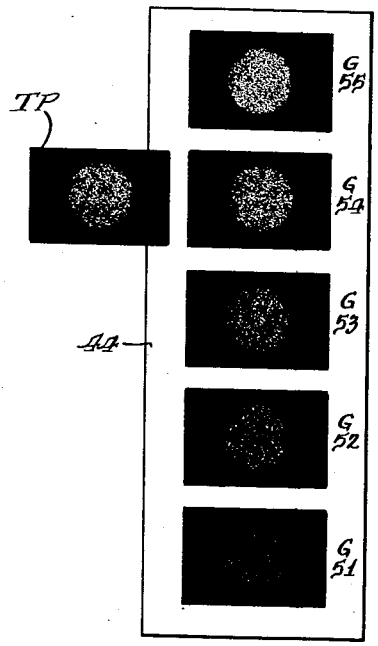
INVENTORS:
Irving C. Allen
Don C. Nepper
Frank F. Oehme
By Gary, Desmond & Parker
Attys United States Patent Office
3,129,586
Patented Apr. 21, 1964

3,129,586
APPARATUS FOR TESTING CERTAIN CHARACTERISTICS OF PAPER AND THE LIKE
Irving C. Allen, Don C. Nepper, and Frank F. Oehme, Wisconsin Rapids, Wis., assignors to Consolidated Papers, Inc., a corporation of Wisconsin
Filed Mar. 8, 1961, Ser. No. 94,374
16 Claims. (Cl. 73—159)

The present invention is concerned especially with the testing of paper and paperboard to determine the surface characteristics thereof, e.g., the piling propensity of coated printing papers, to determine the resistance of papers and paperboards and other films to penetration by liquids, and/or to determine the ply bond strength and/or the adhesive setting times for various multi-ply paper stocks.

More specifically, the invention is directed to apparatus for automatically performing pick, penetration and ply bond tests on paper and paperboards, and on any other medium or film susceptible to the same or similar tests.

While the invention is applicable to fields other than the paper industry, we will refer herein by way of example to the testing of paper, from which discussion the applicability of the invention to other fields will become apparent to those skilled in such fields.

In the paper industry, one particular problem facing producers is the propensity that coated offset printing papers have for causing piling on the cylinders of the presses. "Piling," a phenomenon observable principally in multi-color offset presses, is the accumulation of ink on rollers, plates, or blankets, when one of the transmitting surfaces retains more ink than it transfers, and occurs when relatively insoluable coating materials from the surface of the paper contaminate the printing ink and cause the printing ink to build up or "Pile" on the later cylinders of the press. Piling resulting from coating particle contamination is usually peculiar to multi-color presses where the effect of moisture applied to a coated paper surface on the first unit can result in a piling of ink on succeeding blankets.

It is one object of the present invention to provide means for determining in advance the piling propensity of coated offset papers. Specifically, we have discovered that the wet pick property of a given paper is substantially directly proportional to its piling propensity. Heretofore, however, the test for wet pick was subject to such variation as to afford little if any reliability as a criterion since the test, i.e., the wet thumb test, consisted of wetting one's thumb, pressing the thumb on the paper, rapidly removing the thumb from the paper and visually observing the amount of coating material on the thumb. Obviously, the amount of moisture, the pressure applied, the duration of pressure application, the speed of removal and the estimate of coating material on the thumb were all variable and mitigated against reliability.

It is another object of this invention to provide apparatus for automatically testing the "pick" of a coated paper to exacting repetitive standards, thereby to render the test accurate, consistent and completely reliable.

In conjunction with the foregoing, an object of the invention is to provide test apparatus comprising a pair of relatively movable pads adapted for reception of the test medium or paper therebetween, means for moving the pads toward one another, for applying a preselected or predetermined amount of pressure thereto for a preselected or predetermined interval of time, and for rapidly separating the pads upon expiration of the selected time interval.

A further object of the invention is the provision of pick standards with which the test medium may be compared visually or photometrically to facilitate grading of each medium tested; and to correlate the grading to given degrees of piling propensity.

In addition, it is to be noted that the resistance of the paper to penetration of moisture is also a valuable test since it will convey information relative to deterioration of the bond between the paper and the coating materials consequent upon wetting of the paper in the successive units of a multi-color offset press. Also, penetration resistance is a criterion of the properties of a wide variety of papers and paperboards.

In view of the foregoing, it is also an object of this invention to provide test apparatus for consistent and reliable ascertainment of the penetration resistance of test media; and in particular to provide in apparatus as above defined, a counter for measuring the length of time the pads are engaged with a test medium, control means for said counter operatively associated with said pads for energizing the counter upon engagement of said pads with the test medium and for de-energizing the counter upon movement of said pads away from one another, and means associated with said pads for sensing the presence of moisture in a continuous path between said pads as a consequence of penetration of the moistening agent through the medium, said moisture sensing means being operatively associated with said pad moving means for causing movement of said pads away from one another upon penetration of the medium by the moistening agent.

A further object is to provide test apparatus as defined accommodating selective ascertainment of pick and penetration, the apparatus including control circuitry comprising a timer and a counter in parallel with one another, a control switch closed by the pads upon and during engagement of the pads with the medium to be tested, and a selector switch in series with the control switch and having contact means in series with each of said timer and said counter for selectively coupling the same for energization upon engagement of the pads with the medium.

Another valuable test of paper and paperboard, especially coated papers and multi-ply paper and boards is the bond test. It is an object of this invention to provide test apparatus as above defined facilitating automatic performance of the test to exact duplicatable standards, thereby to impart the characteristics of consistency and reliability to the testing of ply bond strength.

Specifically, it is an object of the invention to provide the pad moving means with means for controlling the rate of force application in the pad separating direction selectively between a relatively fast rate and a relatively slow rate, to cause adherence between the pads and the respective sides of the test medium, and to couple the counter in the control circuit at the instant of force application at the slow rate to measure the time required for the pressure to build up sufficiently to pull the paper or paperboard apart, or to pull the coating from the paper, thereby to provide, due to the correlation between elapsed time and pressure build up, a reliable indication of the bond strength of the test medium.

A further object is the provision in the apparatus as above described of means for incorporating both the timer and the counter in the test circuit whereby the pads may be pressed against the medium for a preselected period of time, whereafter force is applied at said slow rate to separate the pads and the counter is set into operation to measure the time (and thus the pressure) required to effect pad separation. By virtue of this arrangement, the apparatus may also be employed to determine, essentially by cut-and-try methods, the optimum adhesive qualities and setting times for adhesively bonded paper and paperboard products.

A still further object of the invention is the provision in a single test instrument of the character above described of control circuitry for accommodating use of the instrument for selective determination of pick resistance, penetration resistance and ply bond strength, the circuitry including as aforesaid a timer and a counter in parallel, a control switch and selector means including a selector switch in series with the control switch and associated with the timer and the counter for selectively coupling the timer and the counter with the control switch; the selector means in this instance also including means for selecting either the fast or the slow rate of force application in the pad separating direction, switch means accommodating simultaneous connection of the timer and the counter in series with the control switch, and an electrical path or circuit to the counter including contact means operatively associated with the timer; whereby the operator may connect just the timer in the circuit and select the fast rate of force application for performance of the pick test; may connect just the counter in the circuit for performance of the penetration test; and may connect both the timer and the counter in circuit and select the slow rate of force application for performance of the ply bond or adhesive setting time test, the timer in the latter instance holding the pads against the medium for a preselected time and operating the pad moving means and the contacts in the counter circuit upon expiration of that time, whereupon the counter is set into operation to measure the length of time required for pad separation.

Other objects and advantages of the invention will become apparent in the following detailed description.

Now, in order to acquaint those skilled in the art with the manner of making and using our improved test apparatus, we shall describe, in connection with the accompanying drawings, a preferred embodiment of our testing apparatus and the preferred manners of making and using the same.

In the drawings:

FIGURE 3 is a side view, partly in section and partly in elevation, of one embodiment of a test pad for the apparatus;

FIGURE 4 is a perspective view of the test pads showing the same set-up for the performance of a pick test;

FIGURE 5 is a schematic electro-mechanical layout of the apparatus and its control circuitry;

FIGURE 6 is a schematic wiring diagram of a suitable control circuit; and

FIGURE 7 is a plan view of a comparison or grading standard for the grading of pick and thus for determining the piling propensity of the tested medium.

Figure 1:
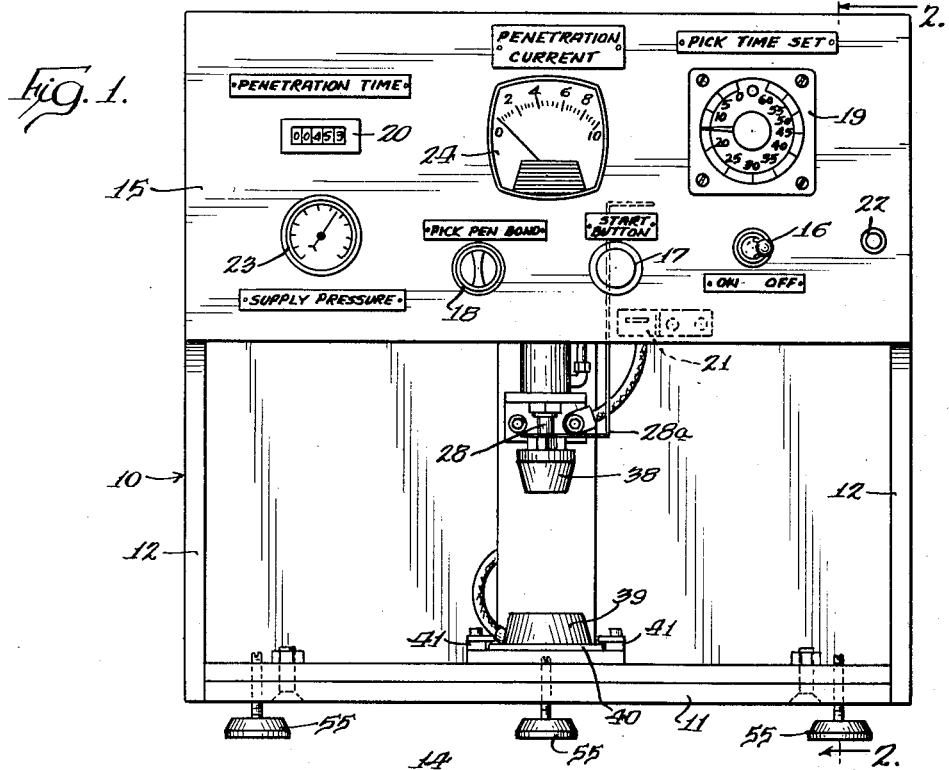
FIGURE 1 is a front elevation of a preferred embodiment of our test apparatus.
Figure 2:
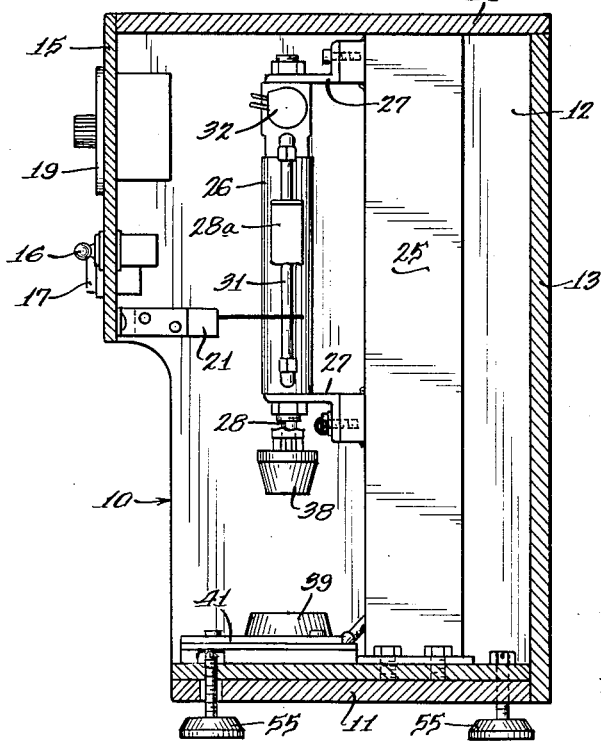
FIGURE 2 is a vertical cross-section of the apparatus taken substantially on line 2—2 of FIGURE 1.

Referring now to the drawings, and particularly to FIGURES 1 to 5, our improved testing apparatus is disclosed as embodied in a table-top case or cabinet 10 made of wood or any other suitable material, and comprising a rectangular base 11 at least the forward edge portion of which is accessible, upright sides 12 and a back 13, a top 14 and a partial front wall 15 located adjacent the upper end of the case. The upper portion of the cabinet, rearwardly of the front wall 15, comprises an enclosure for the instruments of the apparatus, which include an on-off toggle switch 16, a manually operable push button start switch 17, a selector switch 18, a timer 19, an electric counter 20, and a control switch 21. The drawings also show three indicators which are desirable but not essential, namely, an on-off indicator light 22, an air pressure gauge 23 and an ammeter (or alternatively a voltmeter) 24.

Mounted on the base within the interior of the cabinet and adjacent the back wall thereof is a vertical post 25 constituting a support for a vertically disposed pneumatic jack 26 which is mounted on the post in spaced parallel relation thereto by a pair of brackets 27. The jack comprises a cylinder stationarily mounted on the post by the brackets and a piston reciprocable in the cylinder, the piston including a piston rod 28 projecting vertically and axially downward from the lower end of the cylinder. The jack assembly also preferably includes electrically operated valve means adjacent the upper end of the cylinder for controlling the motivating fluid (air under pressure) and thus the advance and retract strokes of the piston. The jack could be single-acting i.e., spring biased in one direction, and control could be exerted over both the advance and the retract strokes of the piston by controlling fluid ingress and egress at the fluid pressure side of the piston. However, we prefer to employ a double-acting jack and to provide separate solenoid operated valves for controlling fluid ingress at both sides of the piston. To this end, as shown in FIGURE 5, we provide a jack having fluid conduits 30 and 31 communicating with the opposite ends of the cylinder, a two-way solenoid valve 32 and 33, respectively, in each conduit and a rate-controlling needle valve 34 and 35, respectively, in each conduit, the two conduits and their associated valves communicating with a fluid supply line 36. Preferably, this line is equipped with a pressure regulator 37 and the previously mentioned pressure gauge 23.

The piston rod 28 is provided at its lower end with a test pad 38 which is juxtaposed to a similar test pad 39 mounted on the cabinet base 11. Preferably, the pad 39 is mounted on a dielectric slide plate 40 which is guided for horizontal movement on the base 11 by suitable channels 41, the channels being so arranged that the same will aline the pad 39 with the pad 38 and yet accommodate movement of the pad into and out of the front of the cabinet to facilitate insertion and removal of test specimens. In use, media constituting part of the test equipment and/or media to be tested are disposed between the pads 38 and 39.

For pick testing, the upper pad 38 may be formed of a cushion material, or a metal pad may be cushioned by one or more layers of black plastic electricians tape or the like. The cushion or cushioned pad is then covered with a two-sided pressure-sensitive tape, and the test medium, such as a small square of coated offset paper, is adhered to the tape (see FIGURE 4). As an alternative, as shown in FIGURE 3, the upper pad may be comprised of a suction-operated media holder or carrier consisting of a pad 38a having a suction nipple on its side for reception of a hose from a vacuum source, an annular recess in its lower face, and ports or passages therein communicating with the nipple and the recess. Where interchangeable pads are used, it is preferred that each have a T-slot in its upper surface portion and that the piston rod 28 be equipped at its lower end with a coupler 42 in the form of an inverted complemental T, whereby the pads may be changed with particular facility. Irrespective of the manner in which the test medium is held to the upper pad 38 or 38a, the lower or base pad 39, for pick testing, receives a small square of black plastic tape or the like, which is adhered to the upper surface of the pad. In normal wet pick testing a single drop of liquid, dispensed manually from an eye or nose droper, is placed on the tape on the lower pad. Suitable liquids include distilled and tap water and standard offset press fountain solutions, the latter generally comprising aqueous solutions containing gum arabic, ammonium bichromate, magnesium nitrate and phosphoric acid. After the drop of liquid is applied to the lower or base tape, the upper pad is lowered to press the test medium at a predetermined pressure against the lower or base pad. As the test medium engages the base pad, the liquid is distributed between the medium and the base tape, and any excess moisture is squeezed out of the test area. After a predetermined time, the piston and the upper pad 38 are snapped upwardly at a rapid rate causing separation of the test medium from the base pad and tape. Depending upon the degree to which the coating material was bonded to the paper, varying amounts of the material will have been deposited on the base tape. The amount of material so deposited is of course indicative of the strength or weakness of the bond. Due to the contrast between the black tape and the normally white or white-colored coating material, the coating material (if any) deposited on the tape will be readily visible. The base tape is removed after each test and replaced by a fresh piece of black tape, whereby the test piece or square of tape removed will constitute an inexpensive permanent record of the test. Also, since it is coated with pressure-sensitive adhesive on its lower side, the test square may readily be attached to a report or record sheet. Each test square of tape may then be compared, visually or photometrically, with pre-established graded standards, as shown for example in FIGURE 7 wherein a test piece indicated at TP is compared to a grade card 44 bearing five graded standards, indicated at G–51 to G–55. With the standards pregraded to piling propensity characteristics, the piling propensity of any coated offset paper may be quickly and accurately determined with complete reliability.

In addition, the same physical and sequential arrangement may be employed for dry pick testing simply by substituting a distributed tack material for the drop of liquid. Suitable tack materials include standard tackgraded inks, commercial polyisobutylene pick oils, and even pressure sensitive tapes or adhesives. Also, a modified pick test may be conducted by first applying a thin layer of tack material to the base tape and placing a drop of wet pick liquid thereon.

The use simply of pressure-sensitive adhesives or tapes on both of the pads not only facilitates use of the described apparatus for dry or surface pick testing as above indicated, but also facilitates the performance of a bond strength test. This test may be employed to determine the bond of coating materials to a base sheet, but at present at least it appears most valuable for use in determining the strength of the bond between the plies of multi-ply stock, and also for determining the optimum setting time of adhesives used in forming multi-ply stock. For this reason, we refer to test herein as the "ply bond" test. In conducting a ply bond test, pressure-sensitive adhesives or two-sided pressure-sensitive tapes of an adhesive strength greater than the strength of the ply materials (or the weaker one of them) are applied to both the upper and lower pads. The two pads are then moved into engagement with the test medium at a predetermined pressure and maintained in contact therewith for a predetermined time. Upon expiration of the time interval, the bond strength can be determined either by applying piston retracting force to the cylinder at a predetermined relatively slow rate and measuring the time elapsed before the pressure builds up sufficiently to separate the plies or to cause failure of the test medium, or by increasing the retracting force in small increments until ply separation or sample failure occurs. To test for optimum adhesive setting time, the two plies to be bonded are secured respectively to the pads, a drop of the adhesive under test is placed on the upper surface of the ply on the base pad, and the above described cycle of operations is repeated. By successively varying the interval of pressure engagement of the two plies, optimum setting time can be ascertained.

The next test capable of being performed by our improved test apparatus is identified by us as the "penetration" test. The object is to determine the resistance of various media to penetration by moisture. The media are electrically non-conductive and include coated and uncoated papers, base stocks, films, etc. The moisture may comprise water, ink, fountain solutions, coating mixtures, penetrating media desired to be incorporated in paper, etc. To conduct the test, the pads employed are formed of electrically conductive material, preferably metal, and the moisture used is conductive or rendered so. As in pick testing, the test media is preferably carried by the upper pad and a drop of liquid is placed on the lower pad so that the media will not contact the moisture until occurrence of a predetermined readily ascertainable point in the cycle of operation, specifically, the moment at which the pads come together to bring the test media into contact with the moisture. In this case, however, the base pad 39 is not covered by tape, and the drop of liquid is placed directly thereon, thereby to provide a conductive path between the medium and the pad. Similarly, an electrically conductive path is provided between the upper pad and the medium by employing a suction-operated metallic medium carrier or holder of the character disclosed in FIGURE 3, or by securing the medium to a metallic pad with conductive adhesive, conductive pressure-sensitive tape, or tape having perforations therethrough. The test is conducted by bringing the two pads into engagement with the opposite sides of the medium, starting a stop watch at the moment both pads contact the medium, applying the positive and negative sides of a direct current source to the two pads and incorporating a sensing or indicator means in the circuit whereby the same will sense or indicate the establishment of an electrical circuit between the two pads at the moment the conductive moisture completes its penetration through the medium, and stopping the stop watch at this moment. In this manner, penetration time can be quickly and accurately determined.

Also, pick characteristics may be ascertained as a function of penetration time by adhering a conductive black tape to the base pad and otherwise proceeding with the standard penetration test above described, whereby a pick test is performed when the pads separate upon penetration of the medium by the drop of moisture.

It is a particular object of our invention to provide apparatus for automatic accomplishment of the tests or test functions above described. To this end, we provide the components and the electrical circuitry depicted most clearly in FIGURES 5 and 6. As will be appreciated from the foregoing, the component over which ultimate control is required is the air motor or jack 26 which moves the pads 38 and 39 toward one another and away from one another, and we have provided a jack including solenoid valves 32 and 33 whereby this control may be facilitated. It is apparent of course that control could be effected by a single four-way solenoid valve or by the two two-way solenoid valves we have shown. Also, by appropriate valve selection, the two solenoids 32 and 33 could be energized simultaneously, in which case they would be connected in series as shown in FIGURE 5, or they could be energized alternately, in which case they would be connected in parallel as shown in FIGURE 6. In either case, it is preferred that energization of the solenoids 32 and 33 be under the control of a holding relay 45 having a coil 45a in parallel with the solenoids and contact means in series with the solenoids. If the solenoids are in parallel with one another, as shown in FIGURE 6, the relay 45 would include a normally open set or pair of contact means 45b in series with the solenoid 32 for controlling admission of air to the upper end of the cylinder 26 and a normally closed set or pair of contact means 45c in series with the other solenoid. If the solenoids are connected in series, the normally open contact 45b would be connected in series with the same. In addition, in the disclosure of FIGURE 6, the relay 45 includes a further contact set comprising normally closed contact means 45d, which will be explained in detail later.

Referring particularly to FIGURE 6, the timer 19 includes a normally closed contact set 19b in series with the contact set 45b and an electrical timing unit 19a in parallel with the coil 45a and the electrically operated control means for the air motor, i.e., the solenoids 32 and 33. The counter 20 is connected in parallel with the timer 19 and the electrically operated means 32—33, and the same is coupled to parallel supply paths 20a and 20b, the path 20a being simply a line connection and the path 20b coupling the contact means 45d in series with the counter. The control switch 21 and the selector switch 18 are connected in series with one another, and the selector switch has two sets of three contact means certain ones of which in each set are connected in series with the timing unit 19a and the counter 20, respectively. Specifically, as shown in FIGURE 6, the selector switch 18 may have two conjointly movable contact blades 19c and 20c engageable selectively with the three stationary contacts of respective sets of contacts whereby the selector switch has three positions; #1 for pick testing, #2 for penetration testing and #3 for ply bond testing. In position #1, blade 19c couples the timing unit 19a in series with the control switch 21, and blade 20c disconnects the counter. In position #2, the blade 20c connects the counter 20 in series with the switch 21 along path 20a, while blade 19c uncouples the timing unit from the circuit. In position #3, blade 19c couples the unit 19a in series with the switch 21, and blade 20c couples the counter 20 in series with the switch along path 20b. Also in position #3, the switch 21 is connected in series via blade 20c with a solenoid coil 46 which is disposed in parallel with the counter 20 and the contact means 45d.

The solenoid coil 46 may be associated with either the valve means 32, the valve means 33, or the needle valve 35, and has for its purpose selective control over the rate of egress of air from the upper side of the piston or the rate of ingress of air to the lower side of the piston, thereby to control the rate of force application to the jack in the direction of pad separation. Specifically, a high rate of force application is desired in at least pick testing, while a slow rate of force application in the pad separating direction is desired for ply bond testing. Accordingly, we prefer to incorporate in the apparatus a solenoid-operated selector valve having the coil 46 therein, whereby automatically to accommodate a high rate of force application in the pad separating direction when the coil 46 is de-energized and a slow rate of force application when it is energized. In this manner, the rate of force application is automatically controlled and the pressure of the motivating fluid may be maintained constant. By way of example, the pressure is preferably in excess of 20 p.s.i. and we have found 35 p.s.i. to afford good results for all of the tests contemplated herein.

As an alternative to the circuit arrangement of FIGURE 6, wherein a single selector switch and a single holding relay are provided, two separate selectors and relays could be employed, as depicted in FIGURE 5. Specifically, selector switch 18 and relay 45 could be incorporated for alternate selection between pick and penetration testing; the switch simply comprising a single blade and two contacts coupled respectively to the timing unit 19a and the counter 20; and the relay comprising simply the coil 45a and the contact means 45b (since the solenoids 32 and 33 are connected in series in this circuit). Then, a secondary selector switch 47 could be connected in the return from the counter 20 for selectively coupling the counter to the selector 18 for normal operation in penetration testing, or to a secondary relay unit 48; the relay unit 48 having a coil 48a in series with the solenoids 32 and 33 and normally closed contact means 48b in series with the counter and line.

The remaining components of the electrical circuitry in both figures comprise a relay unit 50 sensitive to either an increase in current flow or a drop in line potential upon closing of a normally open circuit, or upon decrease in resistance in the circuit; the relay having a normally closed contact set 50b in series with the contact means 19b and 45b and a coil 50a connected in series circuit with the meter 24, the pads 38 and 39 and a battery power supply 51. As shown in FIGURE 5, the relay may be of variable sensitivity and comprise an electronic unit (known in the art) supplied from the A.C. power source. However, the sensing coil is still energized from the battery 51. In operation, the relay or sensing coil 50a will sense completion of an electrical circuit between, or a decrease in the resistance between, the normally spaced pads 38 and 39, and will thereupon open the contacts 50b to exert a control influence over the electrically operated means 32 and 33. Since this unit is used only during penetration testing, we prefer to equip the same with a plug-in lead 52 (FIGURE 5) to the lower or base pad 39, whereby the same may be disconnected when the apparatus is being used for performance of tests other than penetration.

In use of the described apparatus for pick testing, the main or master switch 16 is closed and the selector switch means is set for pick testing. In FIGURE 6, this involves setting the switch 18 to position #1; and in FIGURE 5 involves setting the switch 18 to "pick" and the switch 47 to "pen." When the tapes and test medium are secured to the respective pads, as previously described herein and as shown in FIGURE 4, the push button starting switch 17 is momentarily depressed. The switch 17, being in series with the coil 45a, thereupon causes energization of the holding relay 45 to close the contacts 45b, and in the FIGURE 6 circuit to open the contacts 45c and 45d. When the contacts 45b close, the solenoid 32 is energized via the closed contacts 19b, 50b and 45b, all of which are disposed in parallel to the switch 17. Also, a jumper 54 connects the contact means 19b, 50b and 45b in series with the coil 45a, whereby the said contact means comprise a holding circuit for the relay and the push button switch 17 may be released to open the switch without affecting the energized condition of the solenoid 32.

With the solenoid 32 energized, air is supplied to the upper end of the pad moving cylinder means 26 whereby the pad 38 is moved downwardly to confine the medium to be tested between the two pads at a preselected pressure. Upon and during engagement of both pads with the medium, the switch 21 is closed by the upper pad 38, or more specifically by a switch actuating arm 28a carried by the piston rod 28. Thus, as the medium to be tested is pressed against the base pad, the switch 21 is closed to set the timing unit 19a into operation. Upon expiration of the preselected time period for which the timer was set (by the adjustable knob and pointer shown in FIGURES 1, 2 and 5) the unit 19a causes the contacts 19b to open; thereby de-energizing the solenoid 32 and the relay coil 45a. As this occurs, the solenoid valve 32 discontinues the supply of air to the upper end of the cylinder 26 and the solenoid valve 33 admits air to the lower end of the cylinder at a high rate, whereupon the piston rod and the pad 38 are driven upwardly at a fast rate, whereby the test medium is snapped away from the test tape on the base pad to cause automatic performance of the previously described pick test.

For penetration testing, the switch 16 is of course closed and the selector switch means is set to penetration position; i.e., in FIGURE 6 the switch 18 is set to position #2 and in FIGURE 5 the switches 18 and 47 are both set to "pen." When the test medium has been fixed to the upper pad, the drop of moisture has been placed on the base pad and lead 52 has been plugged into the base pad, the button 17 is depressed to energize the relay 45, close the holding circuit 19b, 50b, 45b and energize the solenoid 32. Air is then admitted to the upper end of the cylinder 26 and the pad 38 and the test medium are lowered to the base pad 39. As the medium is pressed against the base pad, the switch 21 is closed and the counter 20 is set in operation. Initially, the test medium forms an insulating gap between the pads, and so long as it serves as an insulator or a resistance in the circuit the counter continues to operate. However, when the conductive liquid penetrates the medium, a conductive path is established between the pads and this condition is immediately sensed by the coil 50a, whereupon the contacts 50b are opened to de-energize the relay 45 and the solenoid 32. As soon as this occurs, air is supplied (preferably at the high rate) to the lower end of the cylinder 26 whereupon the pad 38 and the medium are driven upwardly. When the upper pad and medium separate from the base pad, the switch 21 opens to stop the counter 20, whereupon the dial of the counter reveals the time elapsed between the instant of contact of the medium with the moisture and the instant the moisture completed its penetration of the medium.

To perform a ply bond or adhesive setting time test, the selector switch means is set to ply bond position; i.e., in FIGURE 6 the switch 18 is set to position #3 and in FIGURE 5 the switch 18 is set to "pick" and the switch 47 is set to "ply." With the test medium in place relative to the pads, the timer 19 is set for a selected interval of pad contact, the counter is re-set to zero, (if a manual pad separating force rate control is provided rather than the automatic control coil 46, it is set to the slow rate) and the button 17 is depressed. Air is thereupon supplied to the upper end of the pad moving means 26 and the pad 38 descends to the base pad 39. As the pads engage the opposite sides of the test medium, the switch 21 is closed to set the timing unit 19a into operation. Also in the FIGURE 6 disclosure, the solenoid coil 46 is energized to set the valve means of the pad moving means to the slow rate of force application in the pad separating direction. At this moment, the counter 20 cannot operate since the contacts 45d (FIGURE 6) or the contacts 48b (FIGURE 5) are open. Upon expiration of the selected time interval, the unit 19a opens the contacts 19b to de-energize the relay 45 and the solenoid 32 (and also the relay 48 in FIGURE 5), whereupon the counter is set in operation via the contacts 45d (FIGURE 6) or 48d (FIGURE 5) and air is supplied at a slow rate to the lower end of the pad moving cylinder means 26. When pressure builds up sufficiently in the lower end of the cylinder to cause the pads to separate, the switch 21 is opened whereupon the counter is stopped with its dial indicating the length of time required for the necessary pressure build-up to separate the pads. Since the rate of fluid pressure admission to the cylinder is known, the time indicated by the counter is directly correlated to the pressure at which separation occurred, thereby to give a clear indication of the ply bond strength of the medium tested.

From the foregoing, it is to be appreciated that we have provided economical and highly efficient apparatus capable of performing, with perfect accuracy and complete consistency, and in completely automatic cycles, each of the tests described herein under the names, "pick," "penetration," and "ply bond." While we have identified these tests as applied particularly to paper and paperboard, it will be apparent to those skilled in respective arts, that the apparatus is equally well suited to the testing of other media for respective characteristics. Also, we have embodied the apparatus in a particularly compact, orderly and conveniently used assembly comprising essentially a bench or desk top test instrument. To accommodate leveling of the instrument substantially irrespective of its location in a laboratory or in a manufacturing facility, we preferably provide the base 11 with at least three adjustable leveling feet 55; and if the instrument is to be located in an area where it may be subject to vibration, these feet are provided on their lower ends with cushioning pads (not shown). Thus, it is apparent that all of the objects and advantages of the invention have been shown herein to be attained in a convenient, economical and practical manner.

While we have shown and described what we regard to be the preferred embodiment of our invention, it is to be appreciated that various changes, rearrangements and modifications may be made therein without departing from the scope of the invention, as defined by the appended claims.

We claim:

1. Testing apparatus comprising a pair of pads between which a medium to be tested may be located, means on one of said pads for adherent engagement with one side of the medium, means for moving said pads toward one another for engagement with the opposite sides of the medium and for moving said pads away from one another at high speed for applying a picking force to the side of the medium opposite said one side, a timer coupled to said pad moving means for maintaining said pads in engagement with the medium for a selected time interval and for then causing said pad moving means rapidly to move said pads away from one another, and control means for said timer actuated by said pads for energizing the timer upon engagement of said pads with the medium.

2. Testing apparatus comprising a pair of pads between which a medium to be tested may be located, means for moving said pads toward one another for engagement with opposite sides of the medium and for moving said pads away from one another, a counter for measuring the length of time said pads are engaged with the medium, control means for said counter actuated by said pads for energizing the counter upon engagement of said pads with the medium and for de-energizing the counter upon movement of said pads away from one another, and means coupled to said pads for sensing the presence of moisture in a continuous path between said pads, said moisture-sensing means being coupled to said pad moving means for energizing the same to cause movement of said pads away from one another upon penetration of the medium by a moistening agent.

3. Testing apparatus comprising a pair of pads between which a multi-ply medium to be tested may be located, means on said pads for adherent engagement with opposite sides of the medium, means for moving said pads toward one another for adherent engagement with opposite sides of the medium and for moving said pads away from one another for applying a ply separating force to the medium, means controlling the rate of force application to said pad moving means when said means operates to separate said pads, a time counter, and control means for said counter coupled to said pad moving means and said pads for energizing the counter upon application of pad separating force to said pad moving means and for de-energizing the counter upon separation of said pads to determine the time required to separate the pads and thus accommodate determination of the bond strength of the medium.

4. Testing apparatus comprising a pair of pads between which a multi-ply medium to be tested may be located, means on said pads for adherent engagement with opposite sides of the medium, means for moving said pads toward one another for adherent engagement with opposite sides of the medium and for moving said pads away from one another for applying a ply separating force to the medium, means controlling the rate of force application to said pad moving means when said means operates to separate said pads, a timer for maintaining said pads in engagement with the medium for a selected time interval, a counter for measuring the time required to separate the pads, and control means for said counter and said timer coupled to said pads for energizing said timer and conditioning said counter for energization upon and during engagement of said pads with the medium, said timer being coupled to said pad moving means and said counter for causing application of pad separating force to said means at said controlled rate and for energizing said counter upon expiration of the selected time interval, said control means de-energizing said counter upon separation of said pads to determine the time required to separate the pads and thus accommodate determination of the bond strength of the medium.

5. Testing apparatus comprising a pair of pads between which a medium to be tested may be located, means for moving said pads toward one another for engagement with opposite sides of the medium and for moving said pads away from one another, a timer coupled to said pad moving means for maintaining said pads in engagement with the medium for a selected time interval and for then causing said pad moving means to move said pads away from one another, a counter for measuring the length of time said pads are engaged with the medium, control means for said counter and said timer actuated by said pads when said pads are engaged with the medium, selector means for selectively coupling said timer and said counter with said control means, and means coupled to said pads and said pad moving means for sensing the presence of moisture in a continuous path between said pads and for energizing the pad moving means upon sensing that condition to cause movement of the pads away from one another 6. Testing apparatus comprising a pair of pads between which a medium to be tested may be located; means for moving said pads toward one another for engagement with opposite sides of the medium and for moving said pads away from one another; means selectively controlling the rate of force application to said pad moving means between a relatively fast rate and a relatively slow rate when said means operates to separate said pads; a timer coupled to said pad moving means for maintaining said pads in engagement with the medium for a selected time interval and for then causing said pad moving means to move said pads away from one another; a counter for measuring the length of time the pads are engaged with the medium; control means for said counter and said timer actuated by said pads when said pads are engaged with the medium; selector means for selectively coupling said timer with said control means and selecting said fast rate of force application, coupling said counter with said control means along a first path, and simultaneously coupling said timer with said control means, coupling said counter with said control means in parallel with said timer along a second path and selecting said slow rate of force application; said timer being coupled in said second coupling path of said counter for causing completion of said path only upon expiration of the selected time interval; and means coupled to said pads and said pad moving means for sensing the presence of moisture in a continuous path between said pads and for energizing the pad moving means upon sensing that condition to cause movement of the pads away from one another.

7. Testing apparatus comprising a pair of pads between which a medium to be tested may be located, means on one of said pads for adherent engagement with one side of the medium, means for moving said pads toward one another for engagement with the opposite sides of the medium and for moving said pads away from one another at high speed for applying a picking force to the side of the medium opposite said one side, electrically operated means controlling said pad moving means, and an electric circuit governing said electrically operated means, said electric circuit comprising a manually operated switch in series with said electrically operated means, a timer having a timing unit in parallel with said electrically operated means and control means in series with said electrically operated means for causing the same to move said pads away from one another, and a control switch in series with said timing unit closed by said pads upon and during engagement of said pads with the medium, said timing unit being operative for a selected time interval and upon expiration of said interval actuating its control means to operate said electrically operated means.

8. Testing apparatus comprising a pair of pads between which a medium to be tested may be located, means for moving said pads toward one another for engagement with opposite sides of the medium and for moving said pads away from one another, electrically operated means controlling said pad moving means, and an electric circuit governing said electrically operated means, said electric circuit comprising a manually operated switch in series with said electrically operated means, an electrically operated counted in parallel with said electrically operated means, a control switch in series with said counter closed by said pads upon and during engagement of said pads with the medium, and means coupled to said pads for sensing the presence of moisture in a continuous path between said pads, said moisture sensing means including contact means in series with said electrically operated means actuated upon occurrence of moisture in a continuous path between the pads for causing said electrically operated means to move said pads away from one another.

9. Testing apparatus comprising a pair of pads between which a multi-ply medium to be tested may be located, means on said pads for adherent engagement with opposite sides of the medium, means for moving said pads toward one another for adherent engagement with opposite sides of the medium and for moving said pads away from one another for applying a ply separating force to the medium, means controlling the rate of force application to said pad moving means when said means operates to separate said pads, electrically operated means controlling said pad moving means, and an electric circuit governing said electrically operated means, said electric circuit comprising a manually operated switch in series with said electrically operated means, a timer having a timing unit in parallel with said electrically operated means and contact means for causing the same to move said pads away from one another in series with said electrically operated means, an electrically operated time counter in parallel with said electrically operated means and said timing unit, a control switch in series with said timing unit closed by said pads upon and during engagement of the pads with the medium, said timer operatively controlling second contact means in series with said counter, said timing unit being operative for a selected time interval after closing of said control switch and upon expiration of said interval actuating both of said contact means to operate said electrically operated means and energize said counter thereby to apply ply separating force to the medium at a controlled rate and to measure the time required for ply separation.

10. Testing apparatus comprising a pair of pads between which a medium to be tested may be located, means for moving said pads toward one another for engagement with opposite sides of the medium and for moving said pads away from one another, electrically operated means controlling said pad moving means, and an electric circuit governing said electrically operated means, said electric circuit comprising a manually operated switch in series with said electrically operated means, a timer having a timing unit in parallel with said electrically operated means and first contact means in series with said electrically operated means for causing the same to move said pads away from one another, an electrically operated counter in parallel with said electrically operated means and said timer unit, a control switch closed by said pads upon and during engagement of the pads with the medium, a selector switch in series with said control switch and having contact means in series with each of said timer unit and said counter for selectively coupling said timer unit and said counter in series with said control switch, and means coupled to said pads for sensing the presence of moisture in a continuous path between said pads, said moisture sensing means including second contact means in series with said electrically operated means for causing the same to move said pads away from one another.

11. Testing apparatus comprising a pair of pads between which a medium to be tested may be located, means for moving said pads toward one another for engagement with opposite sides of the medium and for moving said pads away from one another, electrically operated means controlling said pad moving means, and an electric circuit governing said electrically operated means, said electric circuit comprising a manually operated switch in series with said electrically operated means; an electrically operated counter; first and second parallel paths connecting said counter in parallel with said electrically operated means; a timer having a timing unit in parallel with said electrically operated means and said counter, first contact means operatively controlled by said timing unit and connected in series with said electrically operated means for causing the same to move said pads away from one another and second contact means operatively controlled by said timing unit and connected in said second path in series with said counter; a control switch closed by said pads upon and during engagement of the pads with the medium; a selector switch in series with said control switch and having contact means in series with each of said timer and said counter for selectively coupling said timer, said counter and both said timer and said counter in series with said control switch, said selector switch coupling the counter in series with said control switch via said first path when the counter alone is coupled with the control switch and coupling the counter in series with said control switch via said second path when both the counter and the timer are coupled with the control switch; said timing unit being operative for a selected time interval after closing of said control switch and during said interval actuating said contact means to open said second path to said counter and upon expiration of said interval actuating both said first and second contact means to operate said electrically operated means and to close said second path to said counter, and means coupled to said pads for sensing the presence of moisture in a continuous path between said pads, said moisture sensing means including contact means in series with said electrically operated means and said first contact means actuated upon occurrence of moisture in a continuous path between the pads to cause operation of said electrically operated means.

12. Testing apparatus comprising a pair of pads between which a medium to be tested may be located, means on one of said pads for adherent engagement with one side of the medium, means for moving said pads toward one another for engagement with the opposite sides of the medium and for moving said pads away from one another at high speed for applying a picking force to the side of the medium opposite said one side, electrically operated means controlling said pad moving means, and an electric circuit governing said electrically operated means, said circuit comprising relay means having a coil and first contact means, said first contact means being in series with said electrically operated means for causing the same to move the pads into engagement with the medium, a timer having a timing unit in parallel with said electrically operated means and said coil and having second contact means in series with said first contact means and said electrically operated means for causing the latter to move the pads away from one another, a starting switch in series with said coil, said first and second contact means being in parallel with said switch and in series with said coil and comprising a holding circuit for the relay coil, and a control switch in series with said timing unit closed by said pads upon and during engagement of said pads with the medium, said timing unit being operative for a selected time interval and upon expiration of said interval actuating said second contact means to cause said electrically operated means to move the pads away from one another.

13. Testing apparatus comprising a pair of pads between which a medium to be tested may be located, means for moving said pads toward one another for engagement with opposite sides of the medium and for moving said pads away from one another, electrically operated means for controlling said pad moving means, and an electric circuit governing said electrically operated means, said circuit comprising relay means having a coil and first contact means, said first contact means being in series with said electrically operated means for causing the same to move the pads into engagement with the medium, relay means having a coil connected in series with said pads and responsive to the existence of a continuous electrical path between said pads and second contact means in series with said first contact means and said electrically operated means for causing the same to move the pads away from one another, a starting switch in series with the coil of the first-named relay, said first and second contact means being in parallel with said switch and in series with the first-named coil and comprising a holding circuit for the first-named coil, a counter in parallel with the first-named coil, said first and second contact means and said electrically operated means, and a control switch in series with said counter closed by said pads upon and during engagement of said pads with the medium, the second-named coil being responsive to penetration of the medium by a conductive moistening agent to actuate said second contact means to cause said electrically operated means to move the pads away from one another and thereupon stop said counter.

14. Testing apparatus comprising a pair of pads between which a multi-ply medium to be tested may be located, means on said pads for adherent engagement with opposite sides of the medium, means for moving said pads toward one another for adherent engagement with opposite sides of the medium and for moving said pads away from one another for applying a ply separating force to the medium, means controlling the rate of force application to said pad moving means when said means operates to separate said pads, electrically operated means controlling said pad moving means, and an electric circuit governing said electrically operated means and including a control relay for said electrically operated means, a counter in parallel with said electrically operated means, said relay including contact means in series with said counter and operative to close the circuit to the counter when siad relay operates said electrically operated means to cause application of pad separating force to said pad moving means, and a control switch in series with said counter and said contact means closed by said pads upon and during engagement of said pads with the medium.

15. Testing apparatus comprising a pair of pads between which a multi-ply medium to be tested may be located, means on said pads for adherent engagement with opposite sides of the medium, means for moving said pads toward one another for adherent engagement with opposite sides of the medium and for moving said pads away from one another for applying a ply separating force to the medium, means controlling the rate of force application to said pad moving means when said means operates to separate said pads, electrically operated means for controlling said pad moving means, and an electric circuit for governing said electrically operated means, said circuit including relay means having a coil in parallel with said electrically operated means and first and second contact means, said first contact means being in series with said electrically operated means for causing the same to move said pads into engagement with the medium, a timer having a timing unit in parallel with said electrically operated means and said coil and having third contact means in series with said first contact means and said electrically operated means for causing the latter to move said pads away from one another, a starting switch in series with said coil, said first and third contact means being in parallel with said switch and in series with said coil and comprising a holding circuit for the relay coil, a counter in parallel with said electrically operated means, said switch, said first and third contact means, said timing unit and said coil, said second contact means being in series with said counter and operative to close the circuit to the counter when said relay and said electrically operated means operate to cause application of pad separating force to said pad moving means, and a control switch in series with said timing unit and in series with said counter and said second contact means closed by said pads for conditioning said timing unit and said counter for operation solely during engagement of said pads with the medium, said timing unit being operative for a selected time interval after closing of said control switch and upon expiration of said interval actuating said third contact means and thereby opening said holding circuit, whereupon said electrically operated means is operated to apply ply separating force to the medium at a controlled rate and said counter is energized to measure the time required for ply separation.

16. Testing apparatus comprising a pair of pads between which a medium to be tested may be located, means for moving said pads toward one another for engagement with opposite sides of the medium and for moving said pads away from one another, means selectively controlling the rate of force application to said pad moving means between a relatively fast rate and a relatively slow rate when said means operates to separate said pads, electrically operated means controlling said pad moving means, and an electric circuit governing said electrically operated means, said circuit comprising first relay means having a coil and first and second contact means, said coil being in parallel with said electrically operated means and said first contact means comprising normally open contact means in series with said electrically operated means, a timer having a timing unit in parallel with said electrically operated means and said coil and having third contact means in series with said first contact means and said electrically operated means, said third contact means being normally closed and being opened upon expiration of the time interval for which the timing unit may be set, second relay means having a coil connected in series with said pads and responsive to the existence of a continuous electrical path between said pads and fourth normally closed contact means in series with said first and third contact means and said electrically operated means, a starting switch in series with the coil of said first relay means, said first, third and fourth contact means being in parallel with said switch and in series with the coil of said first relay means and comprising a holding circuit for the first-named relay coil as well as a control circuit for said electrically operated means, a counter in parallel with the coil of said first relay means, said first, third and fourth contact means, said electrically operated means and said switch, first and second parallel electric paths coupled to said counter, said second contact means comprising normally closed contact means connected in series with said counter in said second path, a control switch closed by said pads upon and during engagement of said pads with the medium, and selector means including a switch in series with said control switch and having contact means in series respectively with said timing unit and said counter for selectively connecting said timing unit in series with said control switch and selecting said fast rate of force application, connecting said counter in series with said control switch along said first path and selecting said fast rate of force application, and connecting both said timing unit and said counter, along said second path, in series with said control switch and selecting said slow rate of force application.

References Cited in the file of this patent

UNITED STATES PATENTS

| | | |
|---|---|---|
| 2,545,281 | Hunt | Mar. 13, 1951 |
| 2,702,473 | Dames et al. | Feb. 22, 1955 |
| 2,886,967 | Conti | May 19, 1959 |